(12) United States Patent
Holt et al.

(10) Patent No.: US 8,705,320 B1
(45) Date of Patent: Apr. 22, 2014

(54) AUDIO LOCALIZATION USING MULTILATERATION

(75) Inventors: Jason Holt, Mountain View, CA (US); Richard Francis Lyon, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/615,212

(22) Filed: Sep. 13, 2012

(51) Int. Cl.
*G01S 3/80* (2006.01)
*G01S 3/808* (2006.01)

(52) U.S. Cl.
CPC .................................. *G01S 3/8083* (2013.01)
USPC ............................ 367/125; 367/124; 367/127

(58) Field of Classification Search
USPC ......................................... 367/124, 125, 127
See application file for complete search history.

(56) References Cited

U.S. PATENT DOCUMENTS

| | | | | |
|---|---|---|---|---|
| 4,445,118 | A * | 4/1984 | Taylor et al. | 342/357.395 |
| 8,203,910 | B2 * | 6/2012 | Zhao et al. | 367/127 |
| 2005/0249038 | A1 * | 11/2005 | Rui et al. | 367/124 |
| 2008/0232192 | A1 * | 9/2008 | Williams | 367/8 |
| 2009/0190441 | A1 * | 7/2009 | Zhao et al. | 367/128 |
| 2009/0207694 | A1 * | 8/2009 | Guigne et al. | 367/127 |
| 2009/0310444 | A1 * | 12/2009 | Hiroe | 367/125 |
| 2011/0038230 | A1 * | 2/2011 | Napolitano et al. | 367/127 |
| 2012/0044786 | A1 * | 2/2012 | Booij et al. | 367/127 |
| 2012/0214544 | A1 * | 8/2012 | Shivappa et al. | 455/556.1 |

OTHER PUBLICATIONS

Walworth, M.; Mahajan, A.; "3D Position sensing using the difference in the time of flights from a wave source to various receivers".,
ICAR '97. Proceeding of 8th Int. Conf. on Advanced Robotics, 1997. p. 611-616.*
Farrokhi, et al., "The designing of an indoor acoustic ranging system using the audible spread spectrum LFM (chirp) signal", Canadian Conference on Electrical and Computer Engineering, May 1-4, 2005, pp. 2131-2134.
Girod, et al., "Robust range estimation using acoustic and multimodal sensing", IEEE/RSJ International Conference on Intelligent Robots and Systems, 2001, pp. 1312-1320, vol. 3.
Girod, et al., "Locating tiny sensors in time and space: a case study", IEEE International Conference on Computer Design: VLSI in Computers and Processors, 2002, pp. 214-219.
Hazas, et al., "Broadband Ultrasonic Location Systems for Improved Indoor Positioning", IEEE Transactions on Mobile Computing, May 2006, pp. 536-547. vol. 5, No. 5.
Lienhart, et al., "Providing Common Time and Space in Distributed AV-Sensor Networks by Self-Calibration", Intelligent Multimedia Processing with Soft Computing Studies in Fuzziness and Soft Computing, 2005, pp. 453-473, vol. 168.

(Continued)

*Primary Examiner* — Isam Alsomiri
*Assistant Examiner* — James Hulka
(74) *Attorney, Agent, or Firm* — McDermott Will & Emery LLP

(57) ABSTRACT

Systems and methods for providing audio localization are provided. In some aspects, a method includes receiving phase offsets of a plurality of fixed transmitters from a source other than the plurality of fixed transmitters, detecting an audio localization signal from each of the plurality of fixed transmitters, determining a received phase of the audio localization signal from each of the plurality of fixed transmitters, determining time differences of flight from the mobile receiver to the plurality of fixed transmitters using the received phases, determining distance differences from the mobile receiver to the plurality of fixed transmitters using the time differences of flight, and determining the location of the mobile receiver by performing multilateration using the distance differences.

12 Claims, 11 Drawing Sheets

(56) References Cited

OTHER PUBLICATIONS

Jia, et al., "Distributed Microphone Arrays for Digital Home and Office", IEEE International Conference on Acoustics, Speech and Signal Processing, May 14-19, 2006, pp. V-1065-V-1068, vol. 5.

Lee, et al., "A Light-weight and Scalable Localization Technique Using Mobile Acoustic Source", Proceedings of the Sixth IEEE International Conference on Computer and Information Technology, 2006, pp. 235-240.

Raykar, et al., "Position Calibration of Microphones and Loudspeakers in Distributed Computing Platforms", IEEE Transactions on Speech and Audio Processing, Jan. 2005, pp. 70-83, vol. 13, No. 1.

Priyantha, et al., "The Cricket Location-Support System", 6th ACM International Conferene on Mobile Computing and Networking (ACM MOBICOM), Aug. 2000.

Priyantha, et al., "Mobile-Assisted Localization in Wireless Sensor Networks", IEEE INFOCOM, Mar. 2005.

Srivastava, et al., "Wireless Urban Sensing Systems", CENS Technical Report #65, Apr. 2006, pp. 1-20.

Vickery, "Acoustic Positioning Systems: New Concepts—The Future", Proceedings of the 1998 Workshop on Autonomous Underwater Vehicles, Aug. 20-21, 1998, pp. 103-110.

Filonenko, et al., "Investigating Ultrasonic Positioning on Mobile Phones." *Indoor Positioning and Indoor Navigation (IPIN), 2010 International Conference on*. IEEE, 2010, <http://ieeexplore.ieee.orq/xpls/abs_all.jsp?arnumber=5648235&tag=1>.

Lazik, et al., "Indoor Pseudo-ranging of Mobile Devices Using Ultrasonic Chirps." *Proceedings of the 10th ACM Conference on Embedded Network Sensor Systems*. ACM, 2012, <http://users.ece.cmu.edu/~agr/resources/publications/sensys_12.pdf>.

\* cited by examiner

AUDIO LOCALIZATION USING MULTILATERATION

BACKGROUND

The subject technology generally relates to indoor localization.

GPS makes it easy to discover where things are when there is a clear view of the sky. Indoors, and in other places where GPS satellites are unreachable, localizing is much more difficult.

SUMMARY

In one aspect, the disclosed subject matter can be embodied in a method that includes receiving phase offsets of a plurality of fixed transmitters from a source other than the plurality of fixed transmitters, detecting an audio localization signal from each of the plurality of fixed transmitters, determining a received phase of the audio localization signal from each of the plurality of fixed transmitters, determining time differences of flight from the mobile receiver to the plurality of fixed transmitters using the received phases, determining distance differences from the mobile receiver to the plurality of fixed transmitters using the time differences of flight, and determining the location of the mobile receiver by performing multilateration using the distance differences.

In one aspect, the disclosed subject matter can be embodied in a non-transitory computer-readable medium that includes instructions. The instructions include code for receiving phase offsets of a plurality of fixed transmitters, detecting an audio localization signal from each of the plurality of fixed transmitters, determining a received phase of the audio localization signal from each of the plurality of fixed transmitters, determining time differences of flight from the mobile receiver to the plurality of fixed transmitters using the received phases, determining distance differences from the mobile receiver to the plurality of fixed transmitters using the time differences of flight, and determining a location of the mobile receiver using distance differences to the plurality of fixed transmitters by performing multilateration using the distance differences.

In one aspect, the disclosed subject matter can be embodied in a system that includes a plurality of fixed transmitters each of which transmits a unique audio localization signal, and a fixed receiver for receiving the audio localization signals from the fixed transmitters, receiving locations of the fixed transmitters, determining phase offsets of the fixed transmitters, and transmitting phase offset and location data of the fixed transmitters via a data channel.

Various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
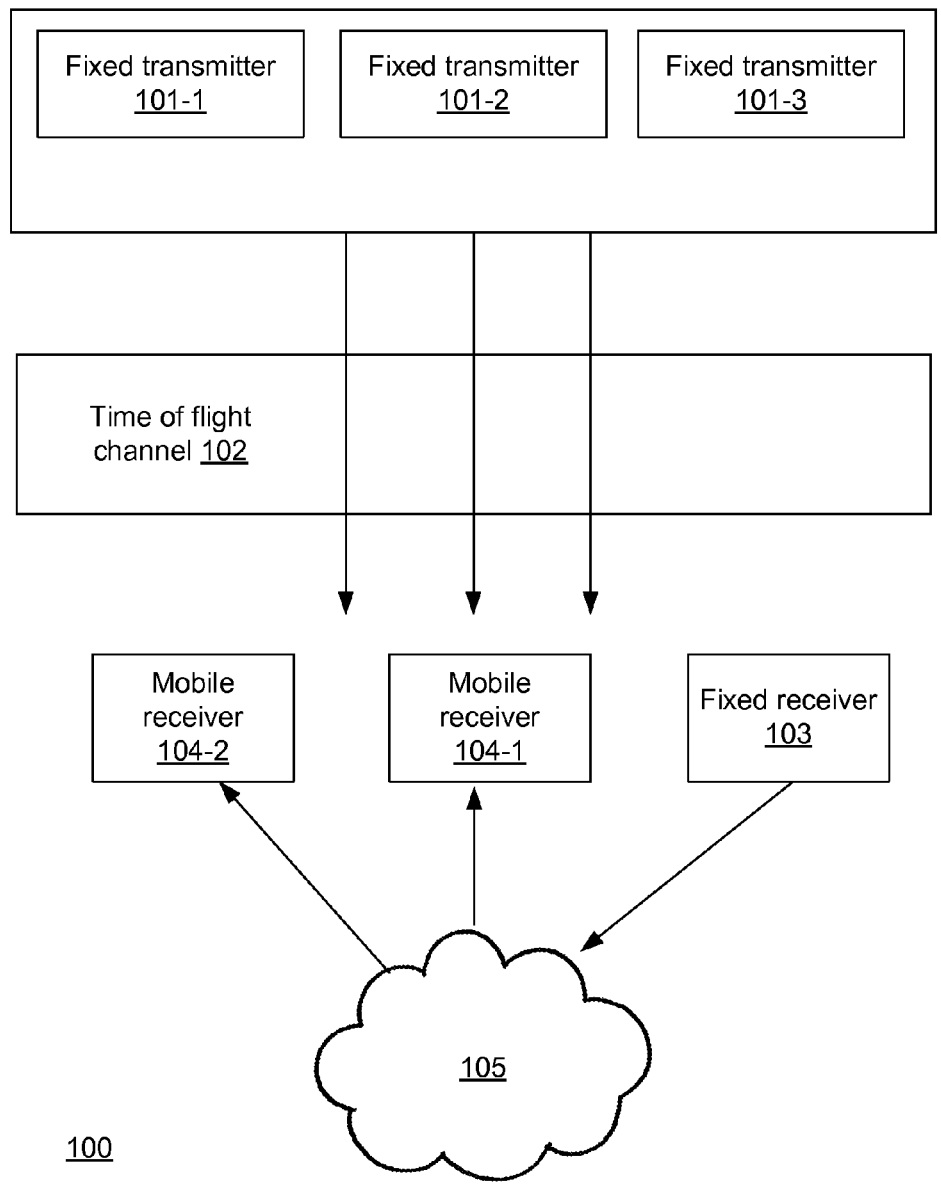
FIG. 1 shows a block diagram of an example audio localization system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The subject technology provides a system and method for providing location information without relying on navigation satellites. The system may have a plurality of fixed transmitters with known locations, a fixed receiver with a known location and a mobile receiver. Each fixed transmitter transmits a unique audio localization signal. The fixed receiver and the mobile receiver may receive the audio localization signals from the fixed transmitters and identify the fixed transmitter of each audio localization signal.

In general, clocks of the fixed transmitters do not need to be synchronized. The fixed receiver may receive audio localization signals and fixed transmitter location data, and calculate phase offsets of the fixed transmitters. Since the locations of the fixed receiver and the fixed transmitters are known, the distance between the fixed receiver and each fixed transmitter are known, and the time of flight ("TOF") between the fixed receiver and each fixed transmitter can be calculated or calibrated when setting up the system. For each fixed transmitter, the fixed receiver may receive the audio localization signal from that fixed transmitter, track a relative TOF from the start of the audio localization signal, calculate the TOF between the fixed receiver and that fixed transmitter using the known distance between the two, and determine the phase offset of that fixed transmitter by subtracting the relative TOF from the TOF. The fixed receiver may then send phase offset and location data of all fixed transmitters to the mobile receiver as system constants over a metadata channel.

A mobile receiver may receive audio localization signals from a plurality of fixed transmitters (e.g., three fixed transmitters). For each of these fixed transmitters, the mobile receiver may determine a received phase of its localization signal. The mobile receiver may calculate its time differences of flight ("TDOFs") to the plurality of fixed transmitters from the received phases relative to the phase offsets of the fixed transmitters, and calculate its distance differences to the plurality of fixed transmitters. With the distance differences to the plurality of fixed transmitters and location data of these fixed transmitters, the mobile receiver may determine its own location via multilateration.

The subject technology may use low cost speakers as fixed transmitters, and microphones in portable electronic devices as the fixed and mobile receivers. In addition, the fixed transmitters' phase offsets may be determined in advance and transmitted to a mobile receiver as a small amount of metadata via a data channel, and may allow a mobile receiver to use time difference of flight measurements for localization without complicated and expensive procedures for synchronizing clocks of the fixed transmitters or controlling audio latency.

FIG. 1 shows a block diagram of an example audio localization system 100. The infrastructure of the system 100 may have a number of fixed transmitters 101-1, 101-2 and 101-3, and a fixed receiver 103. Each of the fixed transmitters may broadcast a unique audio localization signal via a time of flight channel 102. In general, clocks of the fixed transmitters do not need to be synchronized. The fixed receiver 103 may receive the audio localization signals, calculate phase offset of each fixed transmitter, and transmit phase offset and location data of the fixed transmitters over a metadata channel 105. The metadata channel 105 may be an audio channel or a radio channel (e.g., a Wifi channel or a 3G channel). Mobile receivers 104-1 and 104-2 may receive audio localization signals from the fixed transmitters 101-1, 101-2 and 101-3, and the metadata from the fixed receiver 103, and determine their own locations accordingly.

Figure 2:
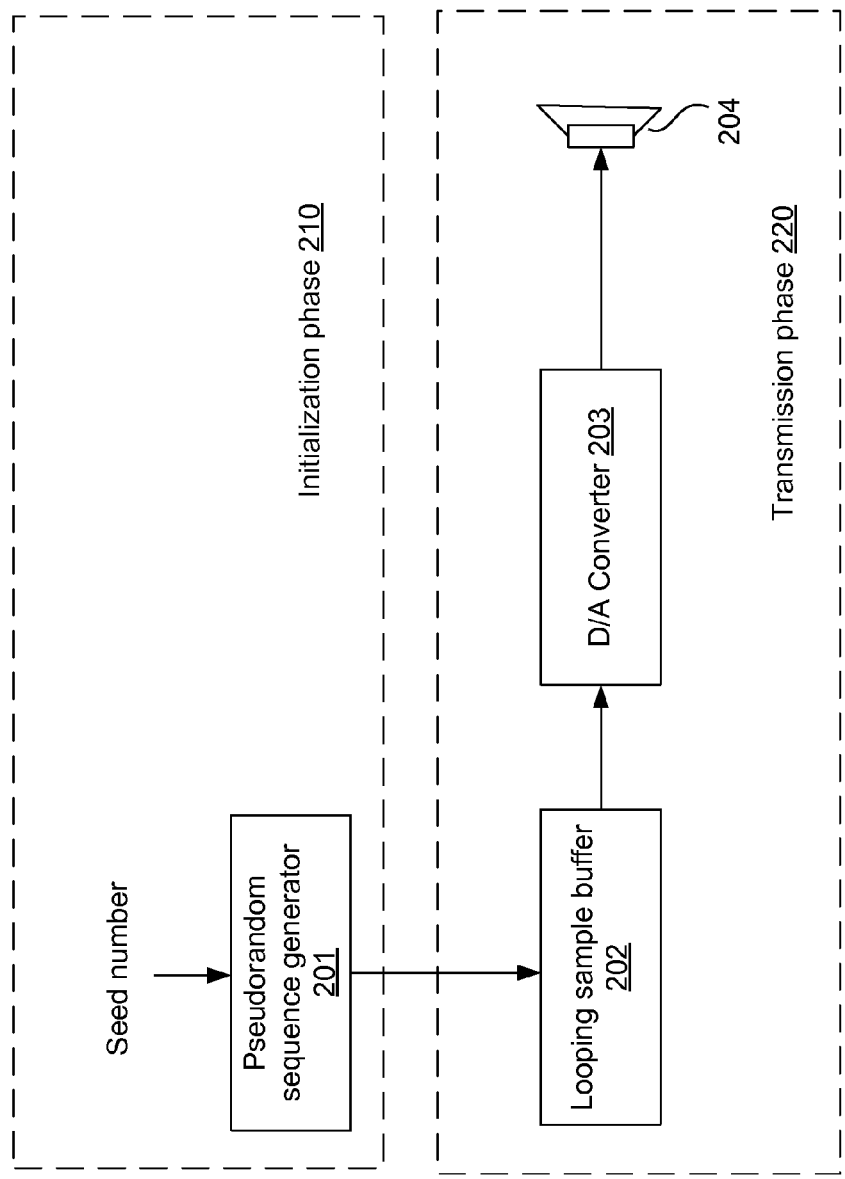
FIG. 2 shows a block diagram of an example fixed transmitter.

FIG. 2 shows a block diagram of an example fixed transmitter 101-1 shown in FIG. 1. As shown, the fixed transmitter 101-1 may include a pseudorandom sequence generator 201, a looping sample buffer 202, a digital-to-analog (D/A) converter 203 and a speaker 204 coupled in series. The pseudorandom sequence generator 201 may belong to an initialization phase 210, and the looping sample buffer 202, the digital-to-analog converter 203 and the speaker 204 may belong to a transmission phase 220.

When setting up the system 100, a seed number (e.g., 1, 2, 3, . . . ) may be assigned to each fixed transmitter to identify that fixed transmitter. In operation, the pseudorandom sequence generator 201 may receive the seed number assigned to the fixed transmitter 101-1 and generate a pseudorandom sequence. The pseudorandom sequence may be buffered by the looping sample buffer 202, converted to an analog signal by the D/A convertor 203 and broadcasted by the speaker 204 into the time of flight channel 102 as an audio localization signal.

The fixed transmitter 101-1 may be any electronic device with a speaker, e.g., a speaker, an audio device, a laptop computer, a desktop computer, a tablet computer, a mobile phone, a smartphone, or a personal digital assistant (PDA). Other devices can also implement the functionalities of the fixed transmitter 101-1.

Figure 3:
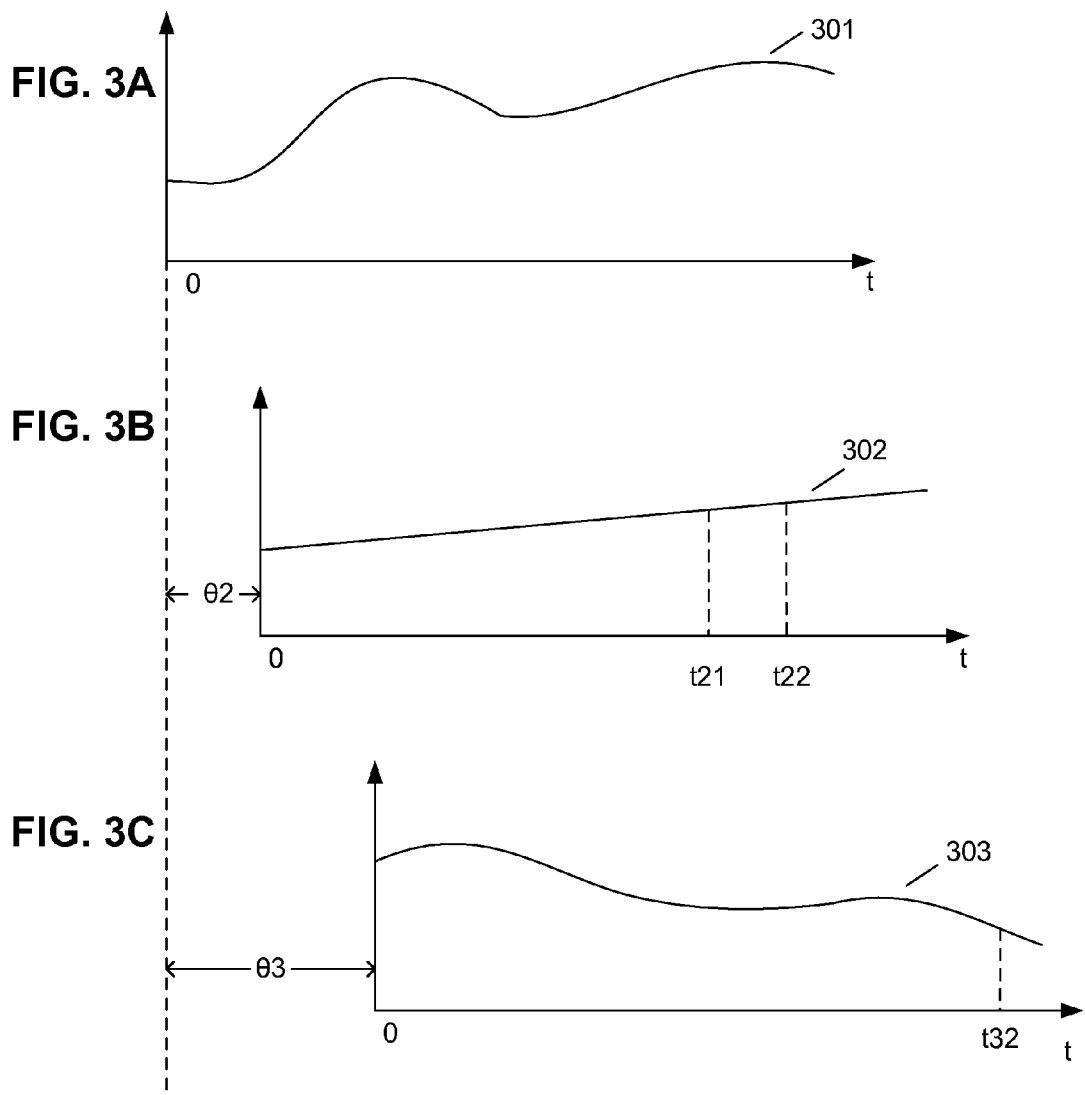
FIGS. 3A, 3B and 3C illustrate examples of audio localization signals.

FIGS. 3A, 3B and 3C illustrate examples of audio localization signals 301, 302 and 303 which may be transmitted by fixed transmitters 101-1, 101-2 and 101-3 respectively. As shown, each of the audio localization signals has a unique shape. In addition, since clocks of fixed transmitters 101-1, 101-2 and 101-3 are not synchronized, the audio localization signals transmitted by them may have different phase offsets. For example, the audio localization signal 301 in FIG. 3A has no phase offset, the audio localization signal 302 in FIG. 3B has a phase offset θ2, and the audio localization signal 303 in FIG. 3C has a phase offset θ3.

Figure 4:
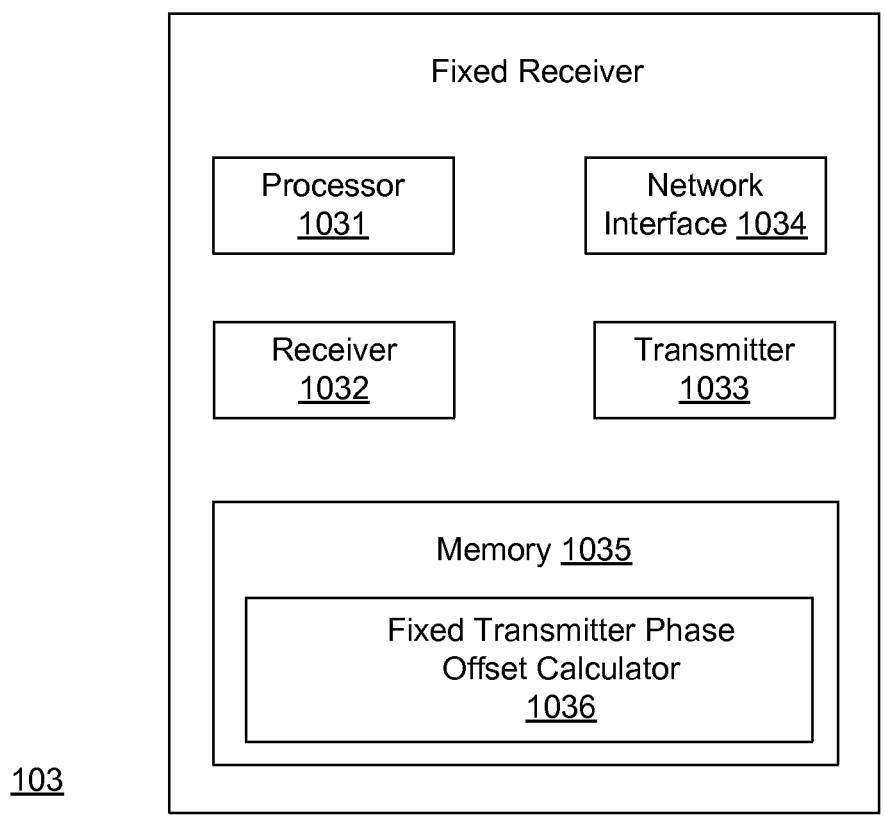
FIG. 4 shows a block diagram of an example fixed receiver.

FIG. 4 shows a block diagram of an example fixed receiver 103 shown in FIG. 1. As shown, the fixed receiver 103 may include a processor 1031, a receiver 1032, a transmitter 1033, a network interface 1034 and a memory 1035. The processor 1031 is configured to execute computer instructions that are stored in a computer-readable medium, for example, the memory 1035. The processor 1031 may be a central processing unit (CPU). The receiver 1032 may receive audio localization signals from the fixed transmitters 101-1, 101-2, and 101-3 via the time of flight channel 102, and may be a microphone. The transmitter 1033 may transmit metadata to mobile receivers 104-1 and 104-2 via the metadata channel 105. The metadata may include location and phase offset data of the fixed transmitters 101-1, 101-2 and 101-3. The network interface 1034 is configured to allow the fixed receiver 103 to receive and transmit signals in the channels 102 and 105. The network interface 1034 may include one or more network interface cards (NICs). The memory 1035 stores data and instructions. As illustrated, the memory 1035 may store a fixed transmitter phase offset calculator 1036, which is shown in more detail in FIG. 5.

The fixed receiver 103 may be any electronic device with a speaker and microphone, e.g., a laptop computer, a desktop computer, a tablet computer, a mobile phone, a smartphone, or a personal digital assistant (PDA). Other devices can also implement the functionalities of the fixed receiver 103.

Figure 5:
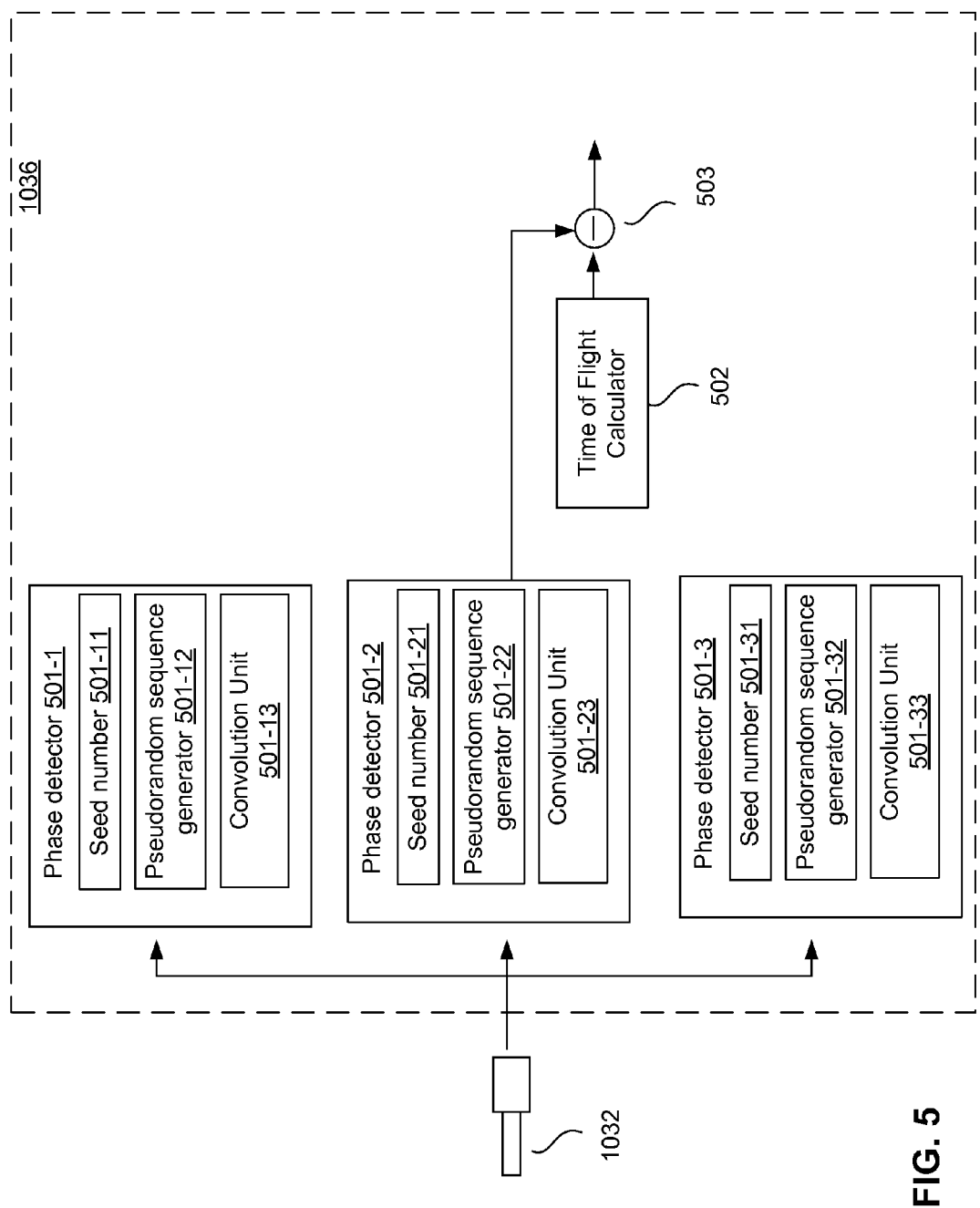
FIG. 5 shows a block diagram of an example transmitter phase offset calculator.

FIG. 5 shows a block diagram of an example fixed transmitter phase offset calculator 1036 shown in FIG. 4. As shown, the fixed transmitter phase offset calculator 1036 may have a plurality of phase detectors (e.g., 501-1, 501-2, and 501-3), a time of flight calculator 502, and a subtractor 503. The phase detector 501-1 may have a seed number unit 501-11, a pseudorandom sequence generator 501-12 and a convolution unit 501-13. The phase detector 501-2 may have a seed number unit 501-21, a pseudorandom sequence generator 501-22 and a convolution unit 501-23. The phase detector 501-3 may have a seed number unit 501-31, a pseudorandom sequence generator 501-32 and a convolution unit 501-33.

The receiver 1032 (e.g., a microphone) shown in FIG. 4 may detect an audio localization signal from a fixed transmitter (e.g., 101-1, 101-2, or 101-3) and send the detected signal to the fixed transmitter phase offset calculator 1036. Each phase detector may have a unique seed number (e.g., 1, 2, 3 . . . ), each audio localization signal may have a unique seed number (e.g., 1, 2, 3 . . . ), and the detected audio localization signal may be assigned to a phase detector having a matching seed number. The pseudorandom sequence generator in that phase detector may generate a pseudorandom sequence. For example, when the detected audio localization signal is the audio localization signal 302 from the fixed transmitter 101-2, its seed number is 2. Since the seed number of the phase detector 501-2 is also 2, the pseudorandom sequence generator 501-22 in the phase detector 501-2 may generate a pseudorandom sequence. The convolution unit 501-23 may then detect the phase of the pseudorandom sequence by convolution, e.g., via fast Fourier transform or Delay Locked Loops. In one example, when the audio localization signal 302 is received by the fixed receiver 103, its phase is t21, as shown in FIG. 3B. Since the fixed transmitter 101-2 may have a phase offset θ2, the phase t21 may be only a relative time of flight between the fixed transmitter 101-2 and the fixed receiver 103, instead of the time of flight between the two.

Since the locations of the fixed transmitter 101-2 and the fixed receiver 103 are known, the TOF between them may be calculated by the TOF calculator 502 as follows:

$$TOF = d/c \qquad (1)$$

wherein d is the distance between the fixed receiver 103 and a fixed transmitter, e.g., 101-2, and c is the speed of sound.

Consequently, the phase offset θ2 of the fixed transmitter 101-2 may be determined by subtracting the relative TOF t21 from the TOF by the subtractor 503 as follows:

$$\text{Phase offset } \theta2 = \text{TOF} - \text{relative TOF} = \text{TOF} - t21 \quad (2)$$

Similarly, the related TOF between the fixed transmitter 101-3 and the fixed receiver 103 may be determined by the phase detector 501-3, the TOF between them may be determined by the TOF calculator 502, and the phase offset θ3 of the fixed transmitter 101-3 may be determined by the subtractor 503.

Figure 6A:
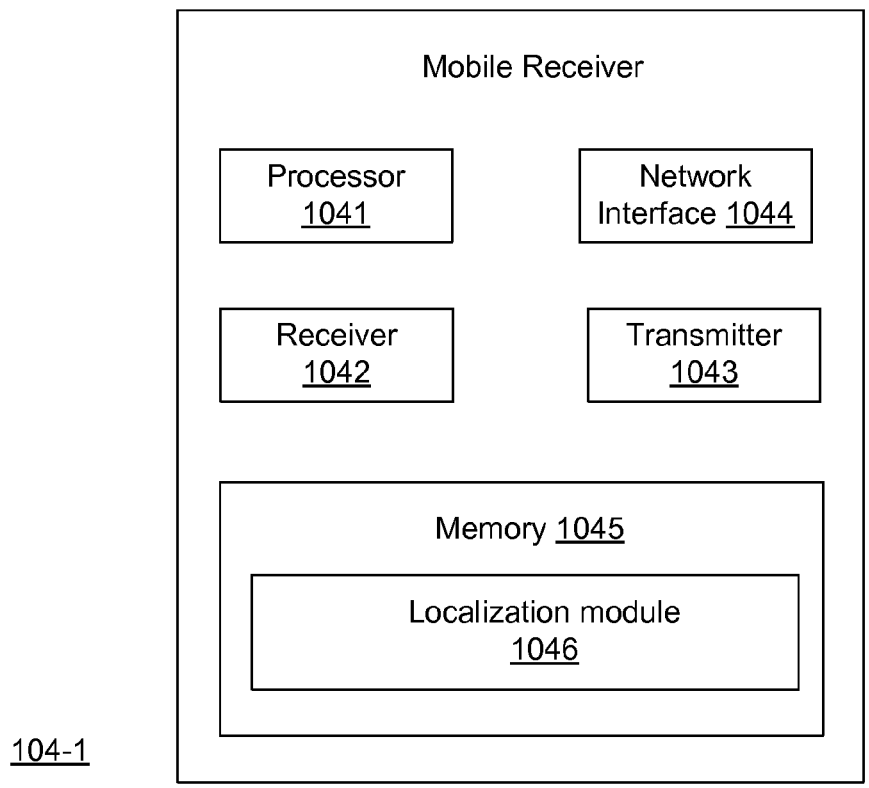
FIG. 6A shows a block diagram of an example mobile receiver.

FIG. 6A shows a block diagram of an example mobile receiver 104-1 shown in FIG. 1. As shown, the mobile receiver 104-1 may include a processor 1041, a receiver 1042, a transmitter 1043, a network interface 1044 and a memory 1045. The processor 1041 is configured to execute computer instructions that are stored in a computer-readable medium, for example, the memory 1045. The processor 1031 may be a central processing unit (CPU). The receiver 1042 may receive audio localization signals from the fixed transmitters 101-1, 101-2, and 101-3 via the time of flight channel 102, and may be a microphone. The receiver 1042 may also receive the metadata from the fixed receiver 103 via the metadata channel 105 which it is an audio channel. The transmitter 1043 may transmit wireless telecommunication signals. The network interface 1044 is configured to allow the mobile receiver 104-1 to receive and transmit signals in the time of flight channel 102 and receive data from the metadata channel 105. The network interface 1044 may include one or more network interface cards (NICs). The memory 1045 stores data and instructions. As illustrated, the memory 1045 may store a localization module 1046, which is shown in more detail in FIG. 7.

Figure 6B:
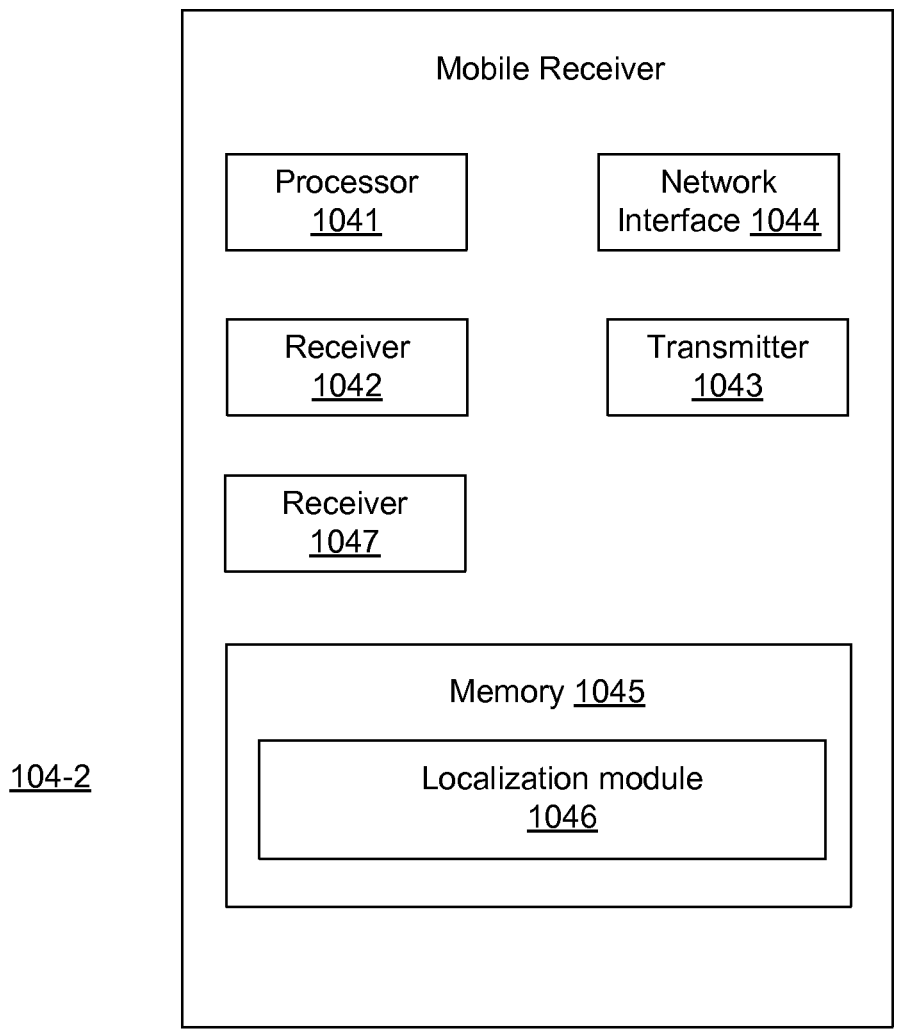
FIG. 6B shows a block diagram of an example mobile receiver.

FIG. 6B shows a block diagram of an example mobile receiver 104-2 shown in FIG. 1. In addition to the blocks shown in FIG. 6A, a separate receiver 1047 may be used to receive the metadata from the fixed receiver 103 when the metadata channel 105 is a radio channel.

The mobile receiver 104-1 and 104-2 may be any electronic device with a microphone, e.g., a laptop computer, a desktop computer, a tablet computer, a mobile phone, a smartphone, or a personal digital assistant (PDA). Other devices can also implement the functionalities of the mobile receiver 104-1.

Figure 7:
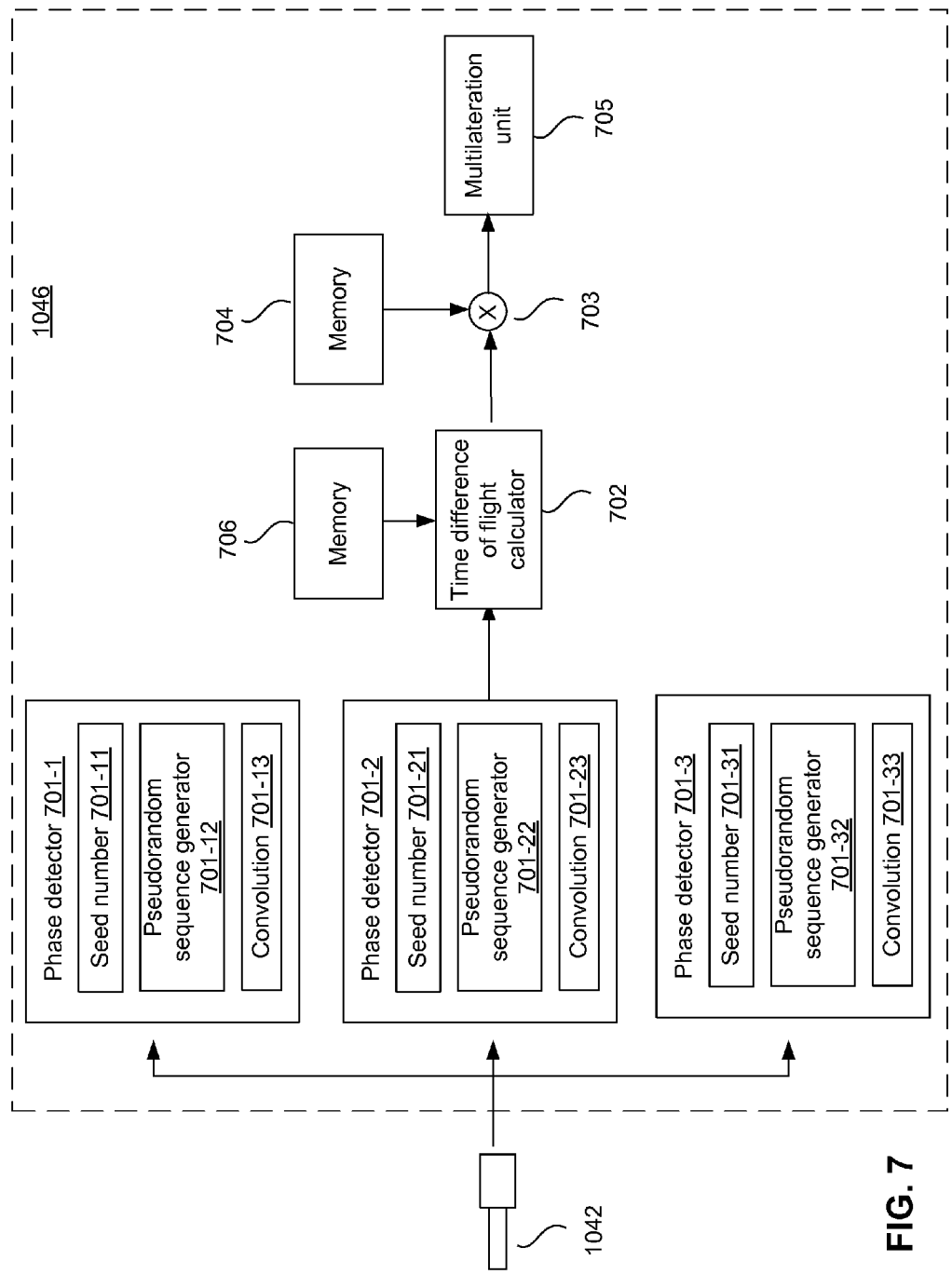
FIG. 7 shows a block diagram of an example localization module.

FIG. 7 shows a block diagram of an example localization module 1046 shown in FIG. 6. As shown, the localization module 1046 may have a plurality of phase detectors (e.g., 701-1, 701-2, and 701-3), a time difference of flight calculator 702, a distance difference calculator 703, a memory 704, a multilateration unit 705 and a memory 706. The phase detector 701-1 may have a seed number unit 701-11, a pseudorandom sequence generator 701-12 and a convolution unit 701-13. The phase detector 701-2 may have a seed number unit 701-21, a pseudorandom sequence generator 701-22 and a convolution unit 701-23. The phase detector 701-3 may have a seed number unit 701-31, a pseudorandom sequence generator 701-32 and a convolution unit 701-33.

The receiver 1042 (e.g., a microphone) shown in FIG. 6A may detect an audio localization signal from a fixed transmitter (e.g., 101-1, 101-2, or 101-3) and send the detected audio localization signal to the localization module 1046. Each phase detector may have a unique seed number (e.g., 1, 2, 3 . . . ), each audio localization signal may have a unique seed number (e.g., 1, 2, 3 . . . ), and the detected audio localization signal may be assigned to a phase detector having a matching seed number. The pseudorandom sequence generator in that phase detector may generate a pseudorandom sequence. For example, when the detected audio localization signal is the audio localization signal 302 from the fixed transmitter 101-2, its seed number is 2. Since the seed number of the phase detector 701-2 is also 2, the pseudorandom sequence generator 701-22 in the phase detector 701-2 may generate a pseudorandom sequence. The convolution unit 701-23 may then detect the received phase of the pseudorandom sequence by convolution, e.g., via fast Fourier transform or Delay Locked Loops. In one example, when the audio localization signal 302 is received by the mobile receiver 104-1, its received phase is t22, as shown in FIG. 3B.

Similarly, the received phase of the pseudorandom sequence from the fixed transmitter 101-1 and 101-3 may be calculated. The phase offsets of the fixed transmitters 101-1, 101-2 and 101-3 may be received from the fixed receiver 103 via the metadata channel 105 and stored in the memory 706. The time differences of flight from the mobile receiver 104-1 to the fixed transmitters 101-1, 101-2 and 101-3 may be determined from the received phases relative to the phase offsets from the fixed receiver 103. For example, when the phase offset of the fixed transmitter 101-2 is θ2, the phase offset of the fixed transmitter 101-3 is θ3, the received phase of the localization signal from the fixed transmitter 101-2 is t22, and the received phase of the localization signal from the fixed transmitter 101-3 is t32, the time difference of flight from the mobile receiver 104-1 to the fixed transmitters 101-2 and 101-3 may be:

$$\text{TDOF} = (t32 - \theta3) - (t22 - \theta2) \quad (3)$$

The distance difference calculator 703 may receive the TDOFs from the time difference of flight calculator 702 and the speed of sound from the memory 704, and calculate the distance differences from the mobile receiver 104-1 to the fixed transmitters 101-1, 101-2 and 101-3 by multiplying the TDOFs with the speed of sound, as follows:

$$\text{Distance difference} = \text{TDOF} \times c \quad (4)$$

wherein c is the speed of sound.

The multilateration unit 705 may receive the distance differences and determine the location of the mobile receiver 104-1 by multilateration.

Figure 8A:
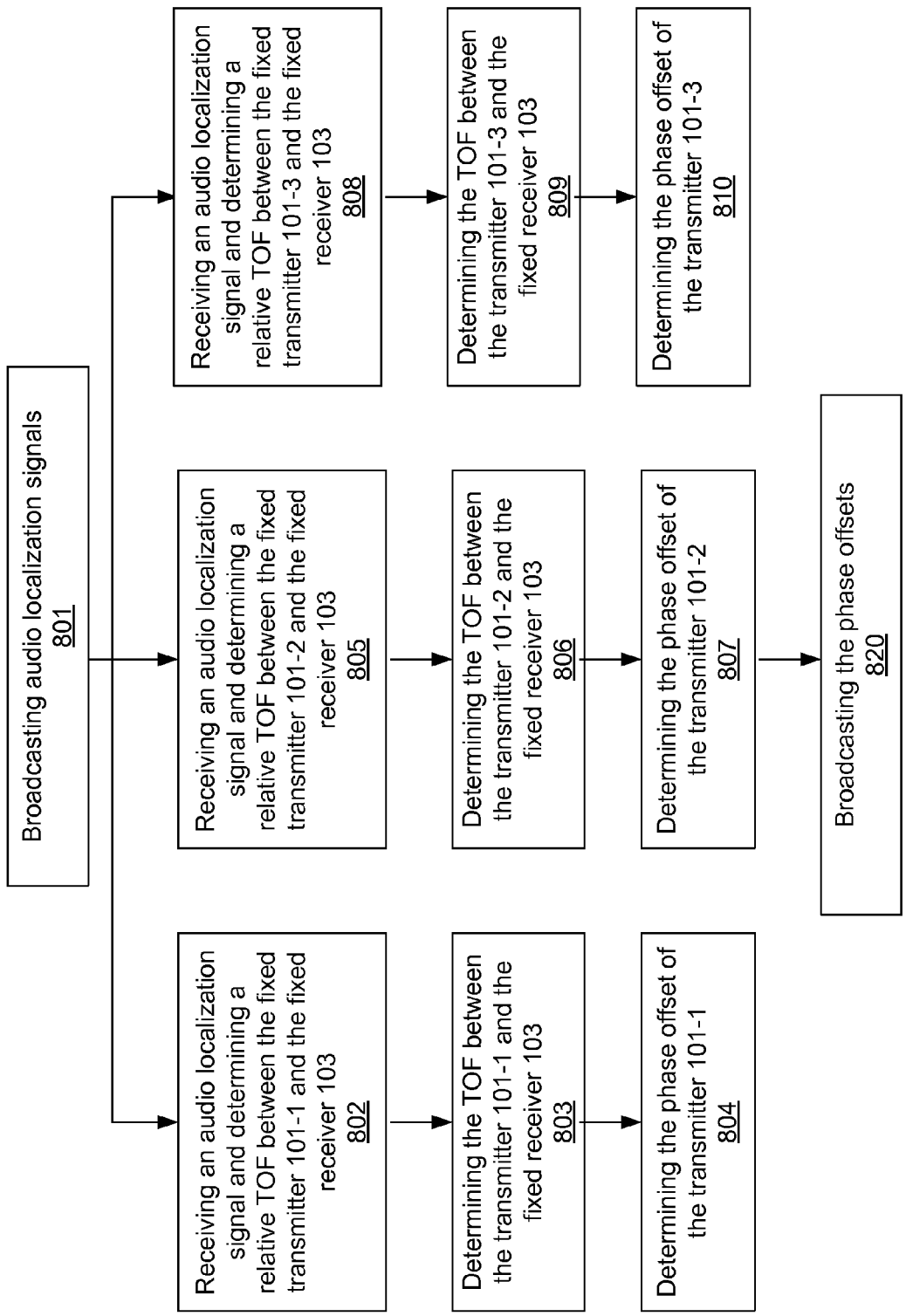
FIGS. 8A and 8B illustrate a flowchart of an example audio localization method.
Figure 8B:
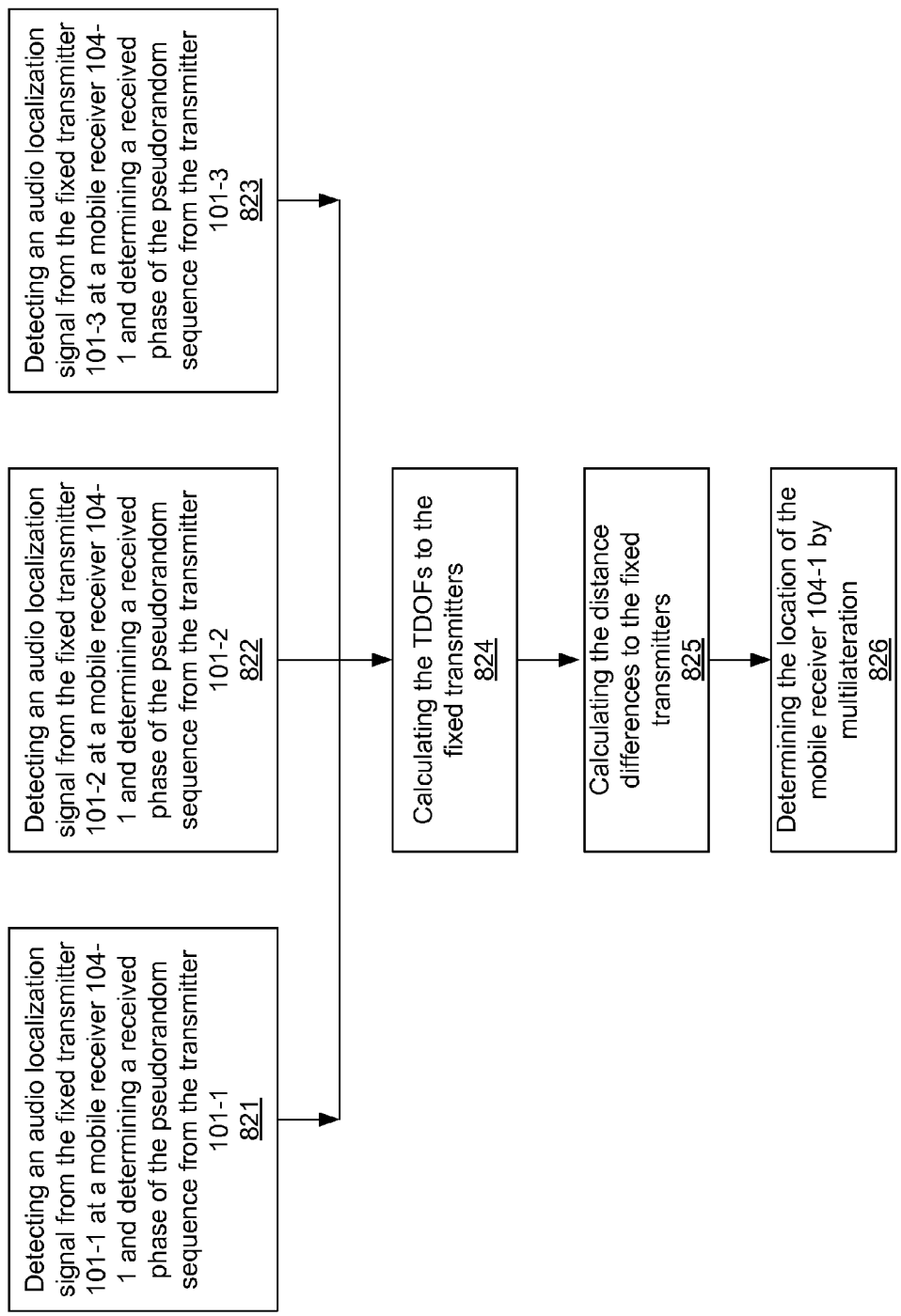

FIGS. 8A and 8B illustrate a flowchart of an example audio localization method.

At 801, each of fixed transmitters (e.g., 101-1, 101-2 and 101-3) may broadcast a unique audio localization signal (e.g., 301, 302 and 303) via a time of flight channel (e.g., 102).

At 802, a fixed receiver (e.g., 103) may receive an audio localization signal from a first fixed transmitter (e.g., 101-1), and determine the relative time of flight between the fixed transmitter (e.g., 101-1) and the fixed receiver (e.g., 103).

At 803, the TOF between the first fixed transmitter and the fixed receiver may be calculated with their distance and the speed of sound, e.g., with equation (1).

At 804, the phase offset of the first fixed transmitter (e.g., 101-1) may be determined by subtracting the related TOF from the TOF, e.g., with equation (2).

Phase offsets of more fixed transmitters (e.g., 101-2 and 101-3) may be determined at 805-810.

At 820, phase offset and location data of the fixed transmitters may be broadcasted (e.g., by the fixed receiver 103) to mobile receivers (e.g., 104-1 and 104-2).

At 821, a mobile receiver (e.g., 104-1) may detect an audio localization signal from a fixed transmitter (e.g., 101-1) and determine a received phase of the localization signal from the fixed transmitter.

The received phase of the localization signal from other fixed transmitters (e.g., 101-2 and 101-3) may be determined at 822-823.

At 824, the TDOFs from the mobile receiver (e.g., 101-4) to the fixed transmitters (e.g., 101-1, 101-2 and 101-3) may be determined.

At 825, the distance differences from the mobile receiver (e.g., 101-4) to the fixed transmitters (e.g., 101-1, 101-2 and 101-3) may be determined by multiplying the TDOFs with the speed of sound.

At 826, the location of the mobile receiver (e.g., 104-1) may be determined by multilateration using the distance differences.

Figure 9:
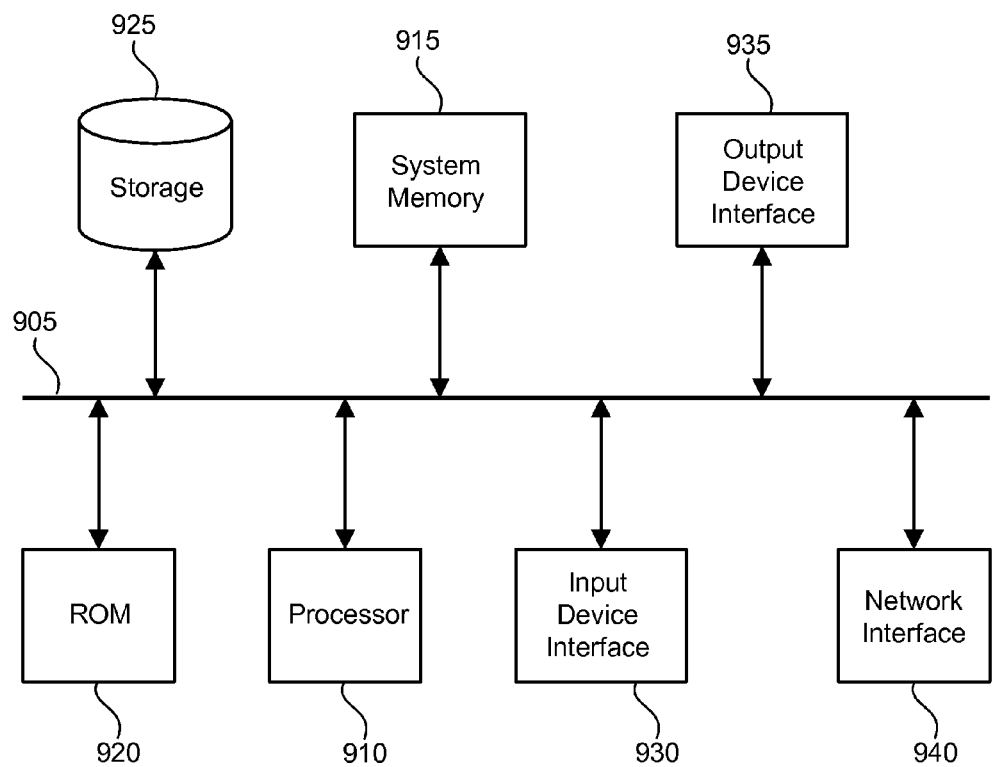
FIG. 9 conceptually illustrates an example electronic system with which some implementations of the subject technology are implemented.

FIG. 9 conceptually illustrates an electronic system 900 with which some implementations of the subject technology are implemented. For example, one or more of the fixed transmitter 101-1, 101-2 and 101-3, fixed receiver 103 and mobile receivers 104-1 and 104-2 may be implemented using the arrangement of the electronic system 900. The electronic system 900 can be a computer (e.g., a mobile phone, PDA), or any other sort of electronic device. Such an electronic system includes various types of computer readable media and interfaces for various other types of computer readable media. Electronic system 900 includes a bus 905, processing unit(s) 910, a system memory 915, a read-only memory 920, a permanent storage device 925, an input device interface 930, an output device interface 935, and a network interface 940.

The bus 905 collectively represents all system, peripheral, and chipset buses that communicatively connect the numerous internal devices of the electronic system 900. For instance, the bus 905 communicatively connects the processing unit(s) 910 with the read-only memory 920, the system memory 915, and the permanent storage device 925.

From these various memory units, the processing unit(s) 910 retrieves instructions to execute and data to process in order to execute the processes of the subject technology. The processing unit(s) can be a single processor or a multi-core processor in different implementations.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some implementations of the subject technology use a mass-storage device (for example a magnetic or optical disk and its corresponding disk drive) as the permanent storage device 925.

Other implementations use a removable storage device (for example a floppy disk, flash drive, and its corresponding disk drive) as the permanent storage device 925. Like the permanent storage device 925, the system memory 915 is a read-and-write memory device. However, unlike storage device 925, the system memory 915 is a volatile read-and-write memory, such a random access memory. The system memory 915 stores some of the instructions and data that the processor needs at runtime. In some implementations, the processes of the subject technology are stored in the system memory 915, the permanent storage device 925, or the read-only memory 920. For example, the various memory units include instructions for localization in accordance with some implementations. From these various memory units, the processing unit(s) 910 retrieves instructions to execute and data to process in order to execute the processes of some implementations.

The bus 905 also connects to the input and output device interfaces 930 and 935. The input device interface 930 enables the user to communicate information and select commands to the electronic system. Input devices used with input device interface 930 include, for example, alphanumeric keyboards and pointing devices (also called "cursor control devices"). Output device interfaces 935 enables, for example, the display of images generated by the electronic system 900. Output devices used with output device interface 935 include, for example, printers and display devices, for example cathode ray tubes (CRT) or liquid crystal displays (LCD). Some implementations include devices for example a touchscreen that functions as both input and output devices.

Finally, as shown in FIG. 9, bus 905 also couples electronic system 900 to a network (not shown) through a network interface 940. In this manner, the electronic system 900 can be a part of a network of computers (for example a local area network ("LAN"), a wide area network ("WAN"), or an Intranet, or a network of networks, for example the Internet. Any or all components of electronic system 900 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase for example an "aspect" does not imply that the aspect is essential to the subject technology or that the aspect applies to all configurations of the subject technology. A disclosure relating to an aspect may apply to all configurations, or one or more configurations. A phrase for example an aspect may refer to one or more aspects and vice versa. A phrase for example a "configuration" does not imply that such configuration is essential to the subject technology or that such configuration applies to all configurations of the subject technology. A disclosure relating to a configuration may apply to all configurations, or one or more configurations. A phrase for example a configuration may refer to one or more configurations and vice versa.

What is claimed is:

1. A machine-implemented method for determining a location of a mobile receiver, the method comprising:
   receiving phase offsets of a plurality of fixed transmitters from a source other than the plurality of fixed transmitters;
   detecting an audio localization signal from each of the plurality of fixed transmitters;
   determining a received phase of the audio localization signal from each of the plurality of fixed transmitters, wherein the received phase is determined by performing fast Fourier transform on a pseudorandom sequence;
   determining time differences of flight from the mobile receiver to the plurality of fixed transmitters using the received phases and phase offsets of the fixed transmitters;
   determining distance differences from the mobile receiver to the plurality of fixed transmitters using the time differences of flight; and
   determining the location of the mobile receiver by performing multilateration using the distance differences.

2. The method of claim 1, wherein the phase offsets are received from a fixed receiver via a data channel.

3. The method of claim 2, wherein the data channel is a radio channel.

4. The method of claim 2, wherein the data channel is a Wifi channel or a 3G channel.

5. The method of claim 1, wherein the audio localization signal comprises a pseudorandom sequence.

6. The method of claim 1, wherein the received phase is determined by performing convolution on a pseudorandom sequence.

7. The method of claim 1, wherein the determining of the distance differences further comprises: multiplying the time differences of flight with the speed of sound.

8. A mobile receiver in a wireless positioning system, comprising:
   a receiver for receiving phase offsets of a plurality of fixed transmitters;
   a microphone for detecting an audio localization signal from each of the plurality of fixed transmitters; and
   a localization module comprising:
      a phase detector for determining a received phase of the audio localization signal of the respective fixed transmitter, the phase detector comprising a convolution unit for determining the received phase by performing convolution on the pseudorandom sequence, wherein the convolution unit determines the received phase by performing Delay Locked Loops on the pseudorandom sequence;
      a time difference of flight calculator for determining time differences of flight from the mobile receiver to the plurality of fixed transmitters using received phases of the fixed transmitters;
      a distance difference calculator for determining distance differences from the mobile receiver to the plurality of fixed transmitters using the time differences of flight; and
      a multilateration unit for determining a location of the mobile receiver using the distance differences.

9. The mobile receiver of claim 8, wherein the phase detector further comprises a pseudorandom sequence generator for receiving a seed number and generating the pseudorandom sequence.

10. The mobile receiver of claim 8, wherein the distance difference calculator further comprises a multiplier for generating distance differences from the mobile receiver to the plurality of fixed transmitters by multiplying the time differences of flight with the speed of the sound.

11. The mobile receiver of claim 8, being selected from the group consisting of a mobile phone, a smartphone, a laptop computer, a tablet computer, and a recorder.

12. A non-transitory computer-readable medium for audio localization, the computer-readable medium comprising instructions that, when executed by a computer, cause the computer to:
   receive phase offsets of a plurality of fixed transmitters;
   detect an audio localization signal from each of the plurality of fixed transmitters;
   determine a received phase of the audio localization signal from each of the plurality of fixed transmitters, wherein the received phase is determined by performing one of fast Fourier transform and Delay Locked Loops on a pseudorandom sequence;
   determine time differences of flight from the mobile receiver to the plurality of fixed transmitters using relative times of flight;
   determine distance differences from the mobile receiver to the plurality of fixed transmitters using the time differences of flight; and
   determine a location of the mobile receiver using distance differences to the plurality of fixed transmitters by performing multilateration using the distance differences.

* * * * *